United States Patent [19]
Dure et al.

[11] 3,745,811
[45] July 17, 1973

[54] FLUID DENSITY GAUGE

[75] Inventors: John D. Dure, Henshaw, Ontario; Charles H. Henshaw, Ottawa, Ontario, both of Canada

[73] Assignee: Computing Devices of Canada Limited, Ottawa, Ontario, Canada

[22] Filed: Aug. 27, 1970

[21] Appl. No.: 67,439

[52] U.S. Cl. .............................. 73/30, 73/32, 73/54
[51] Int. Cl. ............................................. G01n 9/00
[58] Field of Search ................... 73/32, 30, 194 M, 73/67.1, 67, 67.2, 54, 398, 516 LM

[56] References Cited
UNITED STATES PATENTS

| | | | |
|---|---|---|---|
| 2,800,796 | 7/1957 | Westcott et al. | 73/24 X |
| 2,978,899 | 4/1961 | Kritz | 73/24 |
| 3,218,851 | 11/1965 | Sipin | 73/32 X |
| 3,426,593 | 2/1969 | Jacobs | 73/32 X |
| 3,270,565 | 9/1966 | Hawley et al. | 73/516 X |

Primary Examiner—Richard C. Queisser
Assistant Examiner—John P. Beauchamp
Attorney—Weir, Marshall, MacRae & Lamb

[57] ABSTRACT

An apparatus for determining fluid density by accelerating the fluid and detecting pressure changes caused by the inertia of the fluid. A fluid is introduced into a chamber of constant volume and the fluid caused to accelerate by a diaphragm which in practice vibrates back and forth. The pressure change in the fluid adjacent the diaphragm is detected by a microphone or other receiver and the pressure change is used to indicate fluid density.

9 Claims, 7 Drawing Figures

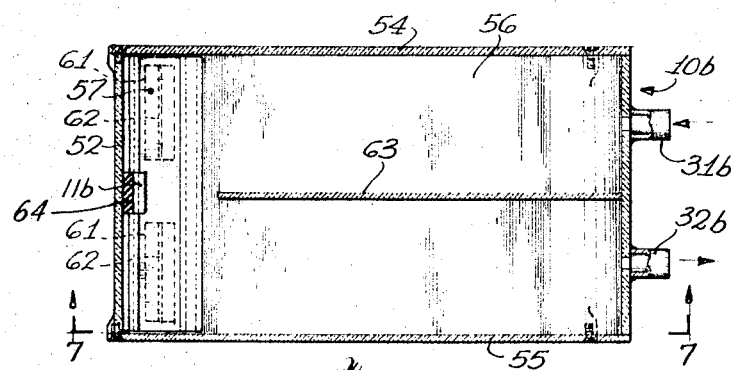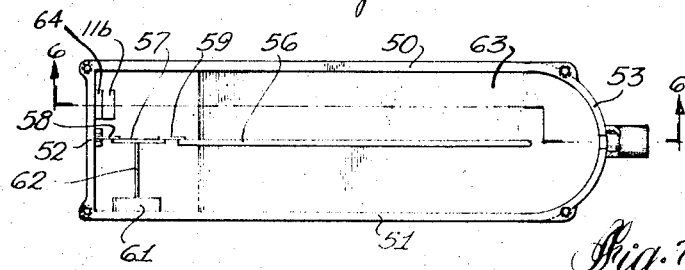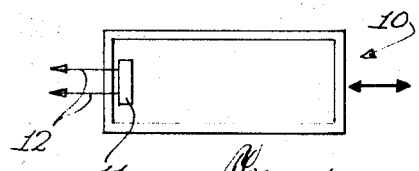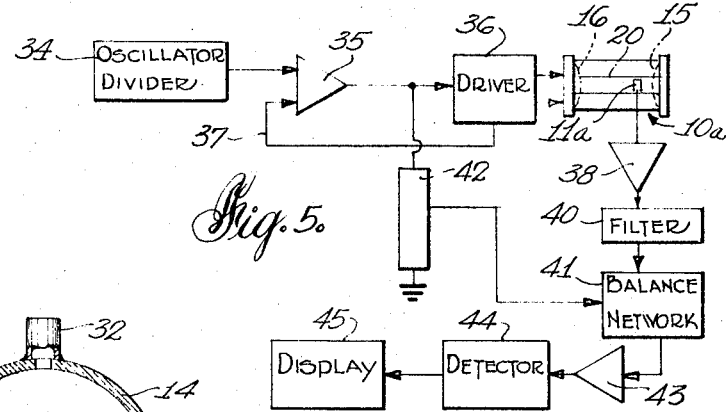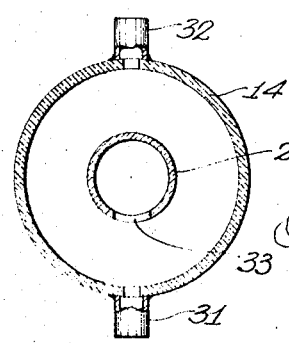

PATENTED JUL 17 1973

INVENTOR
John R. Dure
Charles H. Henshaw
BY
Weir, Marshall, MacRae & Henry
PATENT AGENT

3,745,811

FLUID DENSITY GAUGE

BACKGROUND OF THE INVENTION

This invention relates to fluid density gauges. Simple and reliable fluid density gauges are useful in the laboratory and in industry for measuring and monitoring the density of liquids and gases and for controlling mixtures of liquids and gases. The present invention is suitable for such uses. It has been found that the present invention is particularly suitable for measuring gas density in the form of a gas density altimeter where the gauge is calibrated to read density altitude. The density altitude is important to pilots of fixed and rotary winged aircraft especially when the aircraft are using airfields located at higher altitudes. The capabilities of the aircraft are related to density altitude. Also, density altitude is of importance in fuel mangagement in supersonic transport where a change in density altitude of 5,000 ft. might result in an increase of perhaps 10 percent in fuel consumption.

There are perhaps two main types of prior apparatus or gauges for measuring fluid density. One type of apparatus uses the change in resonant frequency to indicate density changes. A fluid is introduced into a container whose resonant frequency is known. The fluid causes the container to become resonant at an altered frequency and the change is related to density. In this type of apparatus or gauge the container with fluid can be made to vibrate or shake at a controllable varaiable frequency. This type of apparatus tends to respond farily well to temperature changes but less well to pressure changes. The apparatus is cumbersome and tends to be heavy and is not convenient for some applications.

Another type of apparatus or gauge for measuring fluid density relies on the transmission of a wave through the fluid. A container has a transmitter, such as a diaphragm, at one end and a receiver, such as a microphone, at the other end. The amplitude of the signal at the receiver is a function of the density of the fluid, since the density determines to an appreciable extent the energy transfer rate from transmitter to receiver. However, the energy transfer rate is not solely dependent on the density of the fluid medium. Temperature changes may alter the sound field pressure distribution within the container and modify the received signal in a way not reflecting true density change.

SUMMARY OF THE INVENTION

The invention makes use of the inertia in a fluid that is being accelerated or decelerated.

For example, a fluid at rest in a container or chamber causes a detector or receiver within the chamber to indicate a certain pressure. The fluid is caused to accelerate with respect to the chamber in a predetermined direction and the indicated pressure will alter. Towards one end of the chamber in the particular direction there will be an increase in pressure and towards the other end there will be a decrease due to the inertia of the fluid. The indicated pressure change is related to the density of the fluid. In the particular case where the fluid is air, the indicated pressure change will depend on actual pressure changes and on temperature changes and may be calibrated in terms of density altitude.

Because the present invention makes use of the property of inertia it is able to provide a measurement directly of fluid density. The apparatus is responsive to density changes resulting from changes in temperature, pressure and composition, and it is compact.

BRIEF DESCRIPTION OF THE DRAWINGS

FIG. 1 is a simplified sketch according to one embodiment and useful in explaining the invention;

FIG. 4 is a sectional view taken along line 4—4 of FIG. 2;

FIG. 5 is a simplified circuit diagram in block form showing circuitry suitable for apparatus according to the invention;

FIG. 6 is a sectional top view of apparatus according to another embodiment of the invention; and FIG. 7 is a side view taken along line 7—7 of FIG. 6.

DESCRIPTION OF THE PREFERRED EMBODIMENTS

Figure 2:
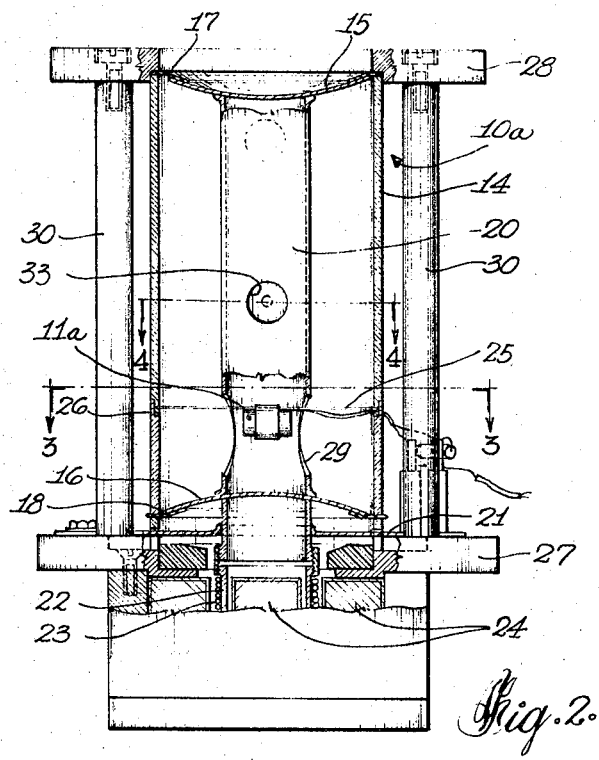
FIG. 2 is a cross-sectional elevation of the chamber and associated apparatus according to another embodiment of the invention.

Referring now to FIG. 1, there is shown a simplified sketch of the invention in which is perhaps the most elementary form. A chamber or container 10 has within it, at one end, a receiver 11. The receiver is a pressure sensitive device and is preferably mounted so that it receives no external vibratory forces. The chamber 10 has a constant volume and is filled with a fluid whose density is to be measured. The chamber is accelerated, preferably along its longitudinal axis so that a maximum of fluid is involved. As the chamber is accelerated there will be, in the region of receiver 11, either an increase or a decrease in pressure depending on the direction of acceleration. This change in pressure is detected by receiver 11 and a signal proportional to the change may be conducted outside chamber 10 by conductor 12. For a given acceleration, the change in pressure is related to the mass of the fluid, and for a constant volume is related to density. In other words, the apparatus makes use of the relationship $$F = m \cdot a$$

where
$F$ = force
$m$ = mass
$a$ = acceleration

It will be apparent that a deceleration of chamber 10 will also provide an output signal related to the density of the fluid within the chamber 10.

Because it is not convenient to make a single acceleration for each measurement, the chamber 10 in a practical embodiment would be vibrated. The amplitude of the vibratory signal appearing on conductors 12 would be related to the density of the fluid within container 10. If the container is oscillated or vibrated to provide the necessary accelerations, it is desirable that the frequency of oscillation should not be a resonant frequency. Unlike certain prior art apparatus which require oscillation at a resonant frequency, the apparatus of this invention should be operated at non-resonant frequencies to avoid secondary and in this case undesirable effects.

Figure 3:
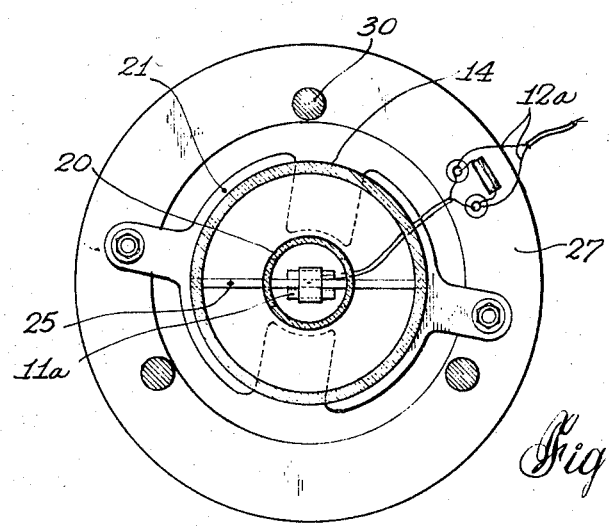
FIG. 3 is a sectional view taken along line 3—3 of FIG. 2.

Referring now to FIGS. 2, 3 and 4 there is shown a more practical form or embodiment of apparatus according to the invention. A chamber 10a is defined by a cylindrical side wall 14 closed substantially at the ends by diaphragms 15 and 16. The longitudinal axis of the chamber, in this instance, is the axis of the cylinder. There is a small gap between the edge of diaphragms 15 and 16 and the inner surface of wall 14. A flexible membrane 17 and 18 extends between the peripheral edge of diaphragms 15 and 16 and the wall 14 to close the ends of chamber 10a. A diaphragm connector 20 extends between diaphragms 15 and 16 ensuring that they remain a fixed distance apart and that chamber 10a thus will have a constant volume. It is important that the volume be constant. The diaphragm connector 20 extends outside chamber 10a past diaphragm 16 where it is supported by suspension 21. Suspension 21 may conveniently be similar to a voice coil suspension in a loudspeaker. The diaphragm connector 20 may have an extension 22 on which is mounted a coil 23 similar to a voice coil in a loudspeaker. Coil 23 is positioned in a concentrated magnetic field such as provided by magnetic poles 24. Coil 23 is connected to a source of alternating current to provide vibratory movement of diaphragm connector 20 and diaphgrams 15 and 16.

A pressure sensitive receiver 11a, which may conveniently be a microphone, is mounted on a carrier 25. Carrier 25 is preferably of a flexible material mounted in a resilient mounting 26 in wall 14 in order to reduce transmission of environmental vibration to receiver 11a. Conductors 12a extend from receiver or microphone 11a externally of chamber 10a to provide externally a signal representing changes in detected pressure. For convenience, receiver or microhpone 11a is positioned about the central axis of chamber 10a by providing holes 29 in diaphragm connector 20 through which carrier 25 extends. The holes 29 should be large so as not to restrict fluid flow.

A mounting plate or base 27 and a top flange 28 are connected together by rods 30 to provide a rigid framework for the chamber 10a and associated components.

An inlet 31 and an outlet 22 are provided in wall 14 at approximately the mid-point between diaphragms 15 and 16. The inlet 31 and outlet 32 are shown in FIG. 4. An opening 33 may be provided in diaphragm connector 20 to improve fluid circulation. There is little change in pressure in the mid-portion of the chamber and it is desirable to locate the inlet and outlet there. Because there is little change in pressure at the mid-portion it is possible to have fluid flowing in at the inlet and out at the outlet continuously without seriously affecting density measurements. Alternately, valving (not shown) can be provided at the inlet and outlet and operated to change the fluid in the chamber between measurements.

Referring now to FIG. 5, the operation of the apparatus will be explained with regard to the circuitry. The frequency stability must be good in order that an accurate density determination can be made. The FIG. 5 circuitry shows the use of a crystal controlled oscillator and divider 34 connected to amplifier 35 whose output is applied to a driver unit 36. The driver supplies current to coil 23 (FIG. 2) to vibrate diaphragm connector 20 and diaphragms 15 and 16. A feedback signal is provided from driver 36 to an input of amplifier 35 via conductor 37 to provide amplitude stabilization. Thus, diaphragms 15 and 16 are driven at a constant fixed frequency and stabilized amplitude.

A microphone 11a in chamber 10a provides a signal to amplifier 38. The output from amplifier 38 is passed through a filter 40 which rejects off-frequency signals generated, for example, by mechanically or acoustically coupled noise from the environment in which the apparatus is operating. The signal passed through filter 40 is applied as one input to a balance network 41. The other input to balance network 41 is a voltage obtained from a voltage divider 42 connected between the output of amplifier 35 and ground. The balance network 41 is adjusted to make the two input signals equal at some reference density value. For example, balance network 41 may include a phase shifter and an emitter follower adjusted to make the signals equal and provide a null condition. In a density altimeter, for example, it is convenient to make the signals equal at a condition of standard temperature and pressure.

The output from balance network 41 is amplified by amplifier 43 and applied to a detector 44 which detects deviations from the null balance condition and provides an output to drive a suitably calibrated display 45.

It should be noted that the signal from receiver 11a is related to fluid density and may be used directly in process control or to drive a display device such as a dial indicator. However, it is advantageous to use the null arrangement as shown in FIG. 5 and just described. By using a null balance it is more convenient to calibrate the apparatus at some reference density and also it provides a more sensitive density indication. The output signal from detector 44 is indicative of the fluid density.

In the operation of the density gauge, since density is a function of both temperature and pressure, it is necessary that the sample be fed into the chamber without modifying the conditions under which measurement is desired. That is, the pressure and temperature of the sample fluid should not be altered by introduction into the chamber of the apparatus.

By way of example, one specific apparatus had a chamber 10 cm long and a peak amplitude or distance of movement of the diaphragm of 0.1 mm. Assuming the drive was sinusoidal the driving function would be represented by $$x = A \cdot \text{Sin}(wt + \phi)$$

where
$x$ = instantaneous displacement
$A$ = peak amplitude
$w$ = frequency in radians
$t$ = time Then the peak acceleration is given by the expression
Peak $a = -w^2 A$
$= -4\pi^2 \cdot f^2 \cdot A$
$= -39.6 \cdot f^2(0.1)$ For a frequency of 400 cps the effective peak acceleration is therefore very approximately $$(-39.6 \times 16 \times 10^4 \times 10^{-2}/980) \cong 65g.$$

This is a considerable acceleration and with a chamber 10 cm long used for measuring air density it provided a pressure corresponding to about 110 to 120 db sound level. The factors determining effective sound pressure sensed by a microphone are proximity of the microphone to the diaphragm, driving amplitude, column length and density of the fluid sample.

Referring now to FIGS. 6 and 7 there is shown a form of apparatus according to the invention which requires only a single diaphragm because the chamber is folded back upon itself. The longitudinal axis of the chamber, in this embodiment, would of course be folded back on itself also. This single diaphragm arrangement simplifies the structure and, because it is a completely enclosed system, it reduces problems of coupling from the outside. In the embodiment of FIGS. 2, 3 and 4 it will be recalled that one surface of each diaphragm is exposed to the inside of the chamber and the other surface is exposed externally of the chamber. While the apparatus of FIGS. 2, 3 and 4 may be enclosed within an outer case during operation, it is still possible that unequal or transient pressure changes might act on an external diaphragm surface and affect the accuracy of the measurement. The embodiment of FIGS. 6 and 7 avoids this possibility.

Chamber 10b is formed by a top wall 50, a bottom wall 51, an end wall 52, a curved end wall 53, and side walls 54 and 55. A central wall 56 extends between side walls 54 and 55 parallel to the top and bottom walls 50 and 51. This provides the folded chamber. The central wall 56 terminates at one end a distance from curved end wall 53 which is approximately the same as the distance between wall 50 and wall 56, and at the other end a distance from end wall 52 sufficient to receive a diaphragm 57. The diaphragm 57 is connected by flexible membranes 58 and 59 to end wall 52 and central wall 56. The diaphragm 57 terminates just short of side walls 54 and 55 so that leakage past the ends is minimized. To further improve the operation, a flexible membrane could be used to connect the ends of diaphragm 57 to walls 54 and 55.

Mounted on bottom wall 51, beneath diaphragm 57 is a vibratory driving device 61 with a magnetically driven armature 62 extending to and connected with diaphragm 57. Two vibratory devices and two armatures may be used in practice depending on the size of diaphragm 57.

An inlet 31b and an outlet 32b are provided in curved end wall 53 to change the fluid in chamber 10b. The inlet and outlet are located at the mid-portion of the folded chamber 10b. In order to improve the fluid flow when the fluid is being changed, a dividing wall 63 extends parallel to and equidistant from side walls 54 and 55 from curved end wall 53 towards diaphragm 57 but terminates short of diaphragm 57. Fluid coming in the inlet 31b flows in each half of the folded chamber towards the diaphragm 57 around the end of dividing wall 63 to outlet 32b.

A receiver 11b is mounted to end wall 52 by a resilient mounting 64. Receiver 11b is adjacent diaphragm 57 and substantially centrally located between walls 54 and 55.

The operation of apparatus using chamber 10b is the same as described in connection with chamber 10a and it is believed further explanation is unnecessary.

It will be seen that other shapes and types of chamber may be used, other drives for the diaphragm or diaphragms may be used, and other variations made without departing from the true scope of the invention.

We claim:

1. Apparatus for determining the density of a fluid comprising
    walls defining a chamber of constant volume,
    inlet means to introduce a fluid into said chamber,
    said chamber volume remaining constant during the acceleration,
    diaphragm means disposed within said chamber,
    means applying a force to said diaphragm to cause a relative acceleration of said fluid with respect to said chamber,
    a receiver within the chamber for detecting pressure changes caused by the inertia of the fluid during acceleration and responsive to said pressure changes for providing a signal related to fluid density and independent of other parameters.

2. Apparatus for determining the density of a fluid, comprising
    walls defining a cylindrical chamber, the ends of said cylindrical chamber being a pair of diaphragms connected at their periphery to the cylindrical side wall by a flexible membrane permitting limited back and forth movement in the direction of the longitudinal axis of the cylinder,
    inlet means to introduce a fluid into said chamber,
    a diaphragm connector extending along said longitudinal axis interconnecting said pair of diahragms and extending externally of said cylindrical chamber,
    a driving means coupled to said diaphragm connector externally of said chamber to cause a vibratory longitudinal movement of said connector and said diaphragms for imparting to the fluid within said chamber a force causing acceleration of the fluid with respect to said chamber,
    said diaphragm connector interconnecting said pair of diaphragms moving said diaphragms in unison to maintain a constant volume in said chamber during said vibratory longitudinal movement, and
    a receiver within said chamber for detecting pressure changes caused by the inertia of the fluid during acceleration and responsive to said pressure changes for providing a signal related to fluid density.

3. Apparatus as defined in claim 2 in which the inlet means comprises an inlet in the cylindrical wall midway between the diaphragms and an outlet in the cylindrical wall substantially opposite said inlet, said inlet and outlet being located substantially midway between the diaphragms to minimize disturbance of the inertial responsive pressure changes.

4. Apparatus as defined in claim 1 in which the said driving means comprises a coil mounted to said diaphragm connector externally of said cylinder, and a magnet providing a magnetic field through said coil, said coil having leads for connection to a source of alternating driving current.

5. Apparatus for determining the density of a fluid, comprising
    walls defining a folded chamber comprising an upper and a lower wall, two side walls, a first and a second end wall, and a central wall extending between said side walls parallel to said upper and lower walls and terminating short of each end wall,
    inlet means to introduce a fluid into said chamber,
    a diaphragm mounted between the adjacent terminating edge of said central wall and said first end wall, said diaphragm being closely spaced from said terminating edge and said first end wall and from said side walls,
    a flexible membrane connecting the periphery of said diaphgram to said terminating edge and said adjacent first end wall to permit limited back and forth movement, a vibratory driving means connected to said diaphragm to cause vibratory back and forth movement therefor for imparting to the fluid within said chamber a force causing acceleration, and a receiver within said chamber for detecting pressure changes caused by the inertia of the fluid during acceleration and responsive to said pressure changes for providing a signal related to fluid density.

6. Apparatus as defined in claim 5 in which the inlet means comprises an inlet and an outlet in said second end wall midway in the chamber between one side and the other side of said diaphragm, and a dividing wall midway between said side walls extending between said upper and said lower walls from said second end wall at one end and at the other end terminating short of said diaphragm, said inlet being positioned on one side of said dividing wall and said outlet on the other.

7. Apparatus as defined in claim 5 in which the receiver is a microphone mounted adjacent said diaphragm with a vibration-damping resilient mounting.

8. Apparatus as defined in claim 5 in which the vibratory driving means is a vibratory magnetic device mounted on one of said upper and lower walls for receiving an alternating driving current and having an armature extending therefrom and connected to said diaphragm to provide said back and forth movement.

9. Apparatus as defined in claim 8 and further including a display means in which the display means comprises circuitry for comparing said signal related to fluid density with a signal representing the alternating driving current and for providing an output related to the difference, and a display device connected to receive said output and responsive thereto to provide an indication of fluid density.

* * * * *